United States Patent
Holman

[11] Patent Number: 6,027,426
[45] Date of Patent: Feb. 22, 2000

[54] NEUTRAL SENSING AND SHIFT LEVER INTERLOCK ASSEMBLY FOR A VEHICULAR TRANSMISSION

[75] Inventor: James L. Holman, Wauseon, Ohio

[73] Assignee: Transmission Technologies Corporation, Farmington Hills, Mich.

[21] Appl. No.: 09/086,430

[22] Filed: May 28, 1998

[51] Int. Cl.$^7$ .............................. B60K 41/04; F16H 63/36
[52] U.S. Cl. ..................... 477/99; 74/473.24; 200/61.88; 200/61.91; 340/456; 403/225; 403/281
[58] Field of Search ............................ 74/473.24, 473.25, 74/523; 200/61.88, 61.91; 340/456; 403/225, 281; 477/99

[56] References Cited

U.S. PATENT DOCUMENTS

| | | |
|---|---|---|
| 1,987,897 | 1/1935 | Fawick . |
| 2,654,268 | 10/1953 | Perkins . |
| 3,534,637 | 10/1970 | Tomlinson ................................ 477/99 |
| 4,371,051 | 2/1983 | Achterholt . |
| 4,441,379 | 4/1984 | Malkowski et al. . |
| 4,491,039 | 1/1985 | Benedek et al. ........................... 477/99 |
| 4,615,233 | 10/1986 | Lasoen . |
| 4,631,984 | 12/1986 | Jones . |
| 4,660,430 | 4/1987 | Bortfeld et al. . |
| 4,793,378 | 12/1988 | Loeffler et al. . |
| 4,827,793 | 5/1989 | Loeffler et al. . |
| 4,856,362 | 8/1989 | Jester . |
| 4,875,383 | 10/1989 | Holman et al. . |
| 5,031,472 | 7/1991 | Dutson et al. ............................. 74/335 |
| 5,035,113 | 7/1991 | Simonyi et al. . |
| 5,285,694 | 2/1994 | Chene . |
| 5,406,860 | 4/1995 | Easton et al. . |
| 5,450,767 | 9/1995 | Willford et al. . |
| 5,468,197 | 11/1995 | Loeffler . |
| 5,517,875 | 5/1996 | Kim . |
| 5,560,255 | 10/1996 | Willford et al. . |
| 5,579,661 | 12/1996 | Yarnell et al. . |
| 5,646,457 | 7/1997 | Vakavtchiev . |

*Primary Examiner*—Allan D. Herrmann
*Attorney, Agent, or Firm*—MacMillan, Sobanski & Todd, LLC

[57] ABSTRACT

A combined neutral sensing and shift lever interlock assembly senses when all of the shift rails of a transmission are in a neutral gear ratio and prevents more than one shift rail from being shifted out of a neutral position at any given time. The transmission includes a shift lever having a lower end that extends through an interlock bracket into selective engagement with the shift rails. The lower end of the shift lever has a sensor provided thereon, while the interlock bracket has a target provided thereon. The target is disposed adjacent to the sensor whenever the lower end of the shift lever is located in a central neutral position (indicating that all of the shift rails are also positioned in their central neutral positions). When this occurs, the sensor causes a neutral relay to be closed, thereby enabling the starter circuit of the vehicle to start the vehicle engine. The target is not disposed adjacent to the sensor whenever the lower end of the shift lever is located outside of the central neutral position (indicating that one of the shift rails is positioned in a gear engaging position). When this occurs, the sensor causes the neutral relay to be opened, thereby disabling the starter circuit of the vehicle from starting the vehicle engine. Thus, the engine of the vehicle cannot be started unless all of the shift rails of the transmission are positioned in their central neutral positions.

20 Claims, 4 Drawing Sheets

NEUTRAL SENSING AND SHIFT LEVER INTERLOCK ASSEMBLY FOR A VEHICULAR TRANSMISSION

BACKGROUND OF THE INVENTION

This invention relates in general to vehicular transmissions and in particular to a combined neutral sensing and shift lever interlock assembly that is adapted to sense when all of the shift rails of the transmission are in a neutral gear ratio and to prevent more than one shift rail from being shifted out of a neutral position at any given time.

In virtually all land vehicles in use today, a transmission is provided in a drive train between a source of rotational power, such as an internal combustion or diesel engine, and the driven axle and wheels of the vehicle. A typical transmission includes a case containing an input shaft, an output shaft and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

Many transmission structures are known in the art for performing these gear ratio selections manually, i.e., in response to some physical exertion by the driver of the vehicle. In a conventional manual transmission, the driver grasps and moves an upper portion of a pivotable shift lever to effect shifting of the transmission. In response thereto, a lower portion of the shift lever engages and moves one of a plurality of shift rails provided within the transmission. The shift rails are typically supported within the transmission case for sliding movement from a central neutral position either axially forwardly to a first gear engaging position or axially rearwardly to a second gear engaging position. Thus, the selection and movement of a particular shift rail causes certain ones of the meshing gears to be connected between the input shaft and the output shaft. As a result, a desired gear ratio is provided between the input shaft and the output shaft. Manually operated transmissions of this general type are well known in the art and are relatively simple, inexpensive, and lightweight in structure and operation. Because of this, the majority of medium and heavy duty truck transmissions in common use today are manually operated.

As is well known, when the engine of the vehicle is initially started, it is desirable that all of the shift rails of the transmission be positioned in the central neutral position. If any of the shift rails of the transmission are positioned outside of the central neutral position in a gear engaging position when the engine is started, the vehicle may experience sudden and unintentional movement. To prevent this undesirable situation from occurring, most manually shifted transmissions are provided with a neutral sensing structure that is designed to disable the starter system of the vehicle when any of the shift rails of the transmission are positioned out of the central neutral position. A typical neutral sensing structure includes a sensor that is responsive to the position of the shift rails and a neutral relay that is connected in the starter circuit of the vehicle. When all of the shift rails are positioned in the central neutral position, the sensor causes the neutral relay to be closed, thereby enabling the starter circuit of the vehicle to start the vehicle engine. When any one of the shift rails is positioned out of the central neutral position, the sensor causes the neutral relay to be opened, thereby disabling the starter circuit of the vehicle and preventing the engine from being started.

As is also well known, after the vehicle engine has been started, it is desirable to affirmatively prevent more than a single one of the shift rails from being located out the central neutral position in order to prevent damage from occurring to the transmission during use. To accomplish this, it is known to provide the transmission with an interlock that is responsive to movement of one of the shift rails out of the neutral position for positively maintaining all of the other shift rails in the neutral position. A typical interlock includes an upper body portion that is engaged by the lower end of the shift lever and a pair of depending arm portions that selectively engage the shift rails. The interlock is supported for lateral movement with the shift lever when the shift lever is initially moved to select a particular one of the plurality of shift rails for subsequent movement. However, the interlock is prevented from axial movement with the shift lever when the shift lever subsequently moved to shift the selected shift rail to a gear engaging position. Thus, the non-selected shift rails are positively maintained in the neutral position by the interlock when the selected shift rail is moved to a gear engaging position.

A variety of neutral sensing structures are known in the art and have functioned satisfactorily. However, known neutral sensing structures are relatively complex and expensive in structure and cannot be retrofitted to existing transmissions without disassembly thereof. Thus, it would be desirable to provide an improved structure for a neutral sensing structure for a vehicular transmission that is relatively simple and inexpensive in structure and can be retrofitted to existing transmissions without disassembly thereof

SUMMARY OF THE INVENTION

This invention relates to a combined neutral sensing and shift lever interlock assembly that is adapted to sense when all of the shift rails of the transmission are in a neutral gear ratio and to prevent more than one shift rail from being shifted out of a neutral position at any given time. The transmission includes a shift lever having a lower end that extends through an interlock bracket into selective engagement with the shift rails. The lower end of the shift lever has a sensor provided thereon, while the interlock bracket has a target provided thereon. The target is disposed adjacent to the sensor whenever the lower end of the shift lever is located in a central neutral position (indicating that all of the shift rails are also positioned in their central neutral positions). When this occurs, the sensor causes a neutral relay to be closed, thereby enabling the starter circuit of the vehicle to start the vehicle engine. The target is not disposed adjacent to the sensor whenever the lower end of the shift lever is located outside of the central neutral position (indicating that one of the shift rails is positioned in a gear engaging position). When this occurs, the sensor causes the neutral relay to be opened, thereby disabling the starter circuit of the vehicle from starting the vehicle engine. Thus, the engine of the vehicle cannot be started unless all of the shift rails of the transmission are positioned in their central neutral positions.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
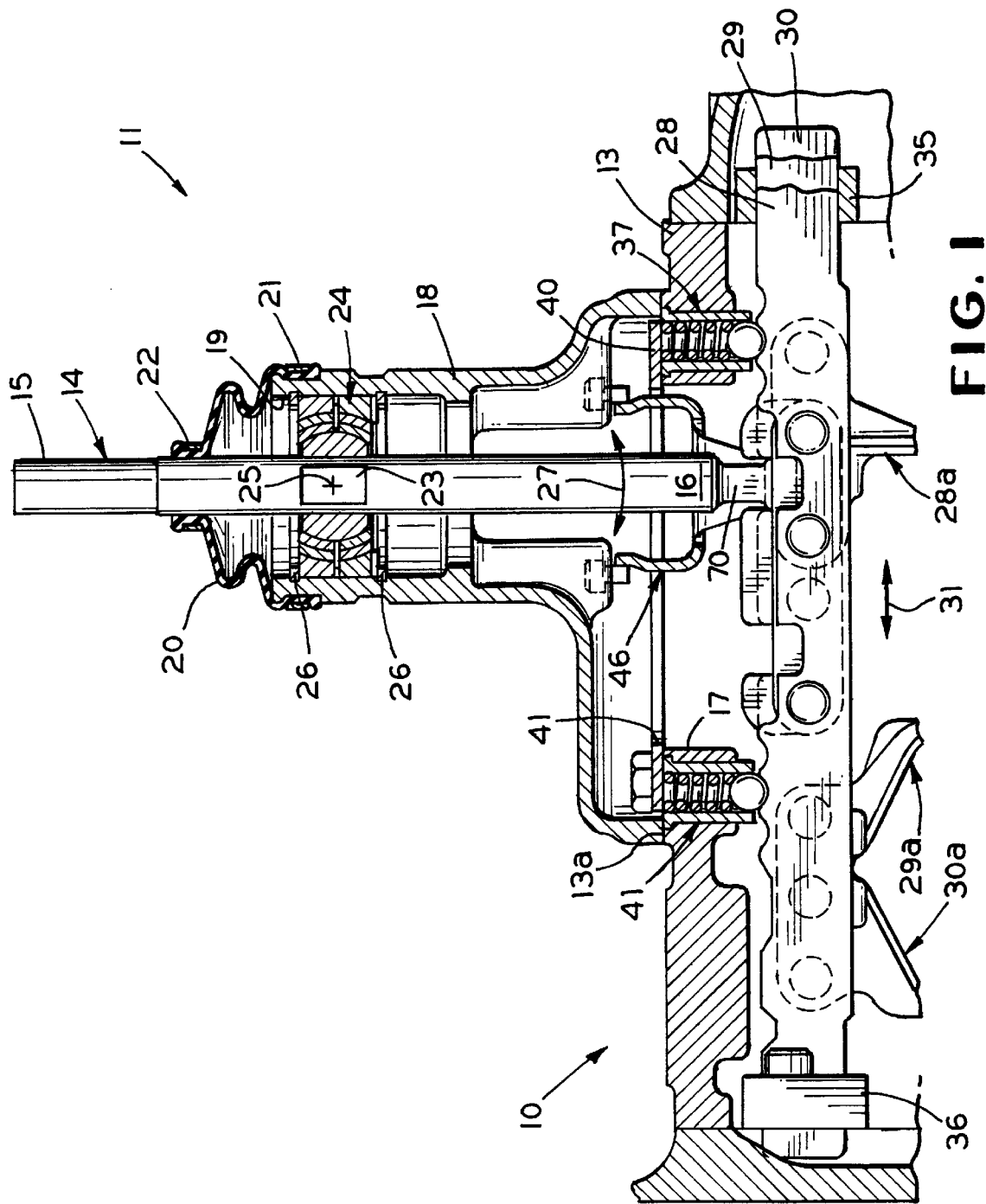
FIG. 1 is a sectional elevational view of a portion of a vehicular transmission including shift lever and tower assembly having a combined neutral sensing and shift lever interlock assembly in accordance with this invention.

Referring now to the drawings, there is illustrated in FIG. 1 a transmission, indicated generally at 10, in accordance with this invention. The structure and operation of the transmission 10 are well known in the art, and only those portions of the transmission 10 that are necessary for a full understanding of this invention will be described and illustrated. Thus, it will be appreciated that the transmission 10 is intended to be representative of any manually shifted transmission structure, including those that are typically used in vehicular applications. The specific structure and operation of the transmission 10 shown in FIG. 1 is described and illustrated in detail in U.S. Pat. No. 4,827,793, the disclosure of which is incorporated herein by reference.

A shift lever and tower assembly, indicated generally at 11, is mounted on a case 13 of the transmission 10 to selectively shift among the various gear ratios. The shift lever and tower assembly 11 includes a shift lever 14 having an upper end 15 that extends upwardly from the transmission 10 and a lower end 16 that extends downwardly through an opening 17 formed through the case 13 into the transmission 10. The shift lever and tower assembly 11 further includes a housing 18 that is secured to the case 13 of the transmission 10 and has an opening 19 formed through the upper end thereof, through which the upper end 15 of the shift lever 14 extends. The opening 19 is closed by a flexible boot 20 that has a larger diameter open end surrounding and attached to the housing 18 by a band 21. Similarly, the boot 20 has a smaller diameter open end surrounding and attached to the upper end 15 of the shift lever 14 by a band 22.

A central portion 23 of the shift lever 14 cooperates in a known manner with a bearing assembly 24 to permit pivoting movement of the shift lever 14 relative to the housing 18 about a pivot point 25. The bearing assembly 24 permits pivoting movement of the shift lever 14 in both a first lateral direction (the selecting direction indicated by the arrow 26 in FIG. 2) and a second axial direction (the shifting direction indicated by the arrow 27 in FIG. 1). The bearing assembly 24 is retained within the housing 18 between a pair of snap rings 23 that engage respective grooves formed in the inner wall of the housing 18.

The housing 18 of the shift lever and tower assembly 11 is mounted on a boss 13a formed on the case 13 of the transmission 10 that surrounds the opening 17. The opening 17 provides access to a plurality of shift rails 28, 29, and 30 that extend in a generally horizontal direction through the transmission 10. The shift rails 28, 29, and are supported for axial sliding movement within the transmission 10 by a pair of bearing blocks 35 and 36. To accomplish this, the bearing blocks 35 and 36 have respective openings formed therethrough that slidably receive each end of each of the shift rails 28, 29, and 30. The shift rails 28, 29, and 30 are independently movable in the axial direction indicated by the arrow 31 in FIG. 1 from the central neutral positions illustrated in FIG. 1 either forwardly to respective first gear engaging positions or rearwardly to respective second gear engaging positions.

The shift rails 28, 29, and 30 have respective forks 28a, 29a, and 30a secured thereto in a conventional manner. The forks 28a, 29a, and 30a extend from the shift rails 28, 29, and 30 downwardly into engagement with respective clutches (not shown) contained within the case 13 of the transmission 10. As is well known, axial movements of the shift rails 28, 29, and 30 cause the associated clutches to selectively connect a plurality of gears between an input shaft and an output shaft of the transmission 10 to provide a desired speed reduction gear ratio therebetween.

Figure 2:
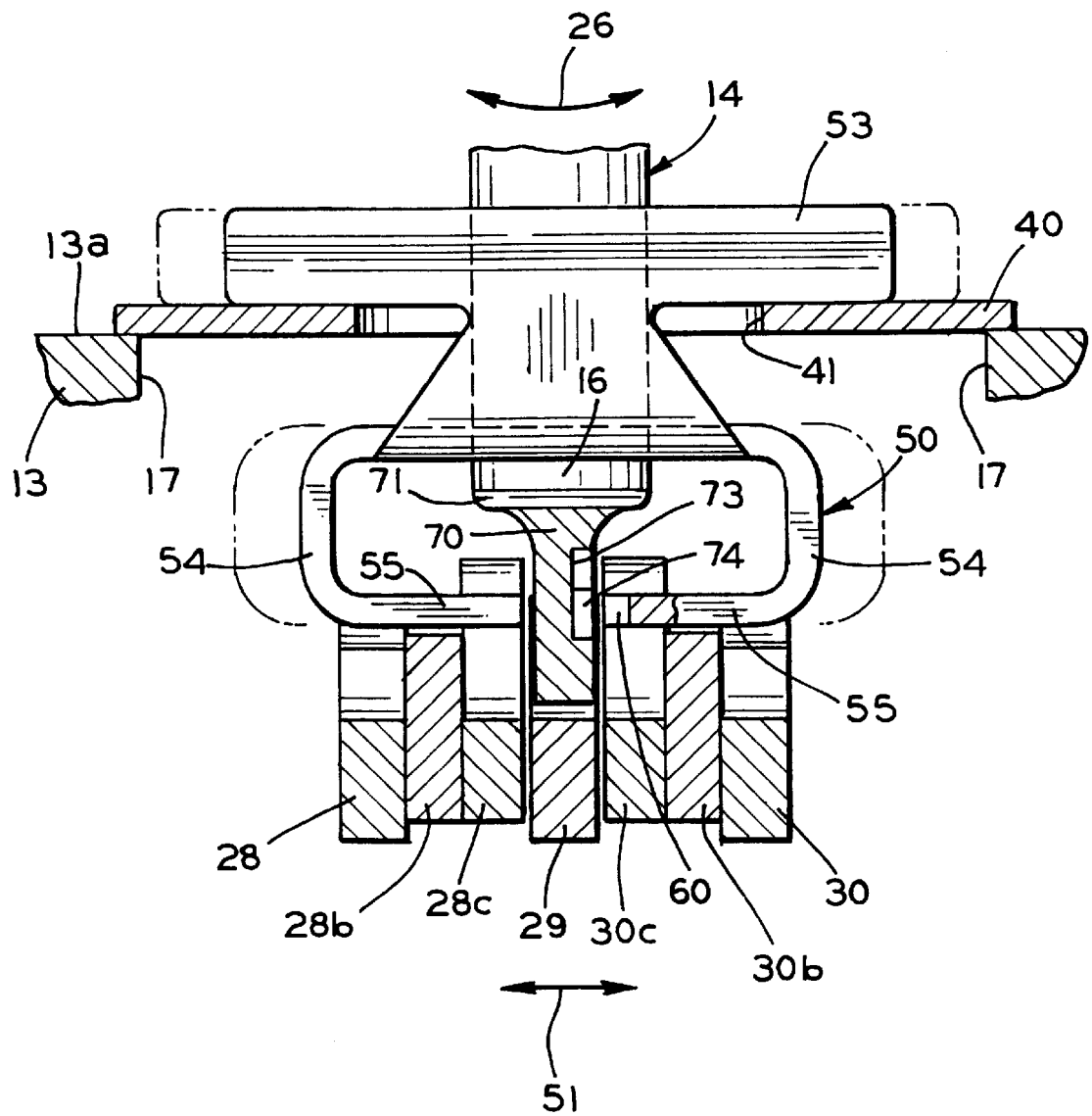
FIG. 2 is an enlarged sectional elevational view of the lower end of the shift lever, the interlock bracket, and the shift rails illustrated in FIG. 1.

Referring to FIG. 2, it can be seen that the shift rail 28 has a stop bar 28b and a connector bar 28c secured thereto. Similarly, the shift rail 30 has a stop bar 30b and a connector bar 30c secured thereto. The connector bars 28c and 30c are provided to facilitate the selection and engagement of the lower end 16 of the shift lever 14 with the shift rails 28 and 30. The stop bars 28b and 30b are provided to limit the amount of selecting movement of the lower end 16 of the shift lever 14 when pivoted in the direction indicated by the arrow 26. The structure and operation of the stop bars 28b, 30b and the connector bars 28c, 30c are conventional in the art.

A first spring loaded ball bearing detent assembly, indicated generally at 37, is mounted in the case 13 of the transmission 10 and is urged downwardly into engagement with a plurality of recesses formed in the shift rail 29 to provide a tactile indication when the shift rail 29 is moved by the shift lever 14 out of the central neutral position to one of its gear engaging positions. Similarly, a second spring loaded ball bearing detent assembly, indicated generally at 41, is urged downwardly into engagement with the shift rail 28, and a third spring loaded ball bearing detent assembly (not shown) is urged downwardly into engagement with the shift rail 30, for the same purpose.

A mounting plate 40 is secured to the case 13 of the transmission 10 about the opening 17. The mounting plate 40 is conventional in the art and has an opening 41 formed therethrough. An interlock bracket, indicated generally at 50, extends within the opening 41 formed through the mounting plate 40. In a manner that will be explained in greater detail below, the interlock bracket 50 is supported on the mounting plate 40 for sliding movement in the lateral direction indicated by the arrow 51 in FIG. 2 relative to the shift rails 28, 29, and 30. However, the interlock bracket 50 is supported on the mounting plate 40 in such a manner as to prevent sliding movement in the axial direction indicated by the arrow 31 in FIG. 1.

Figure 3:
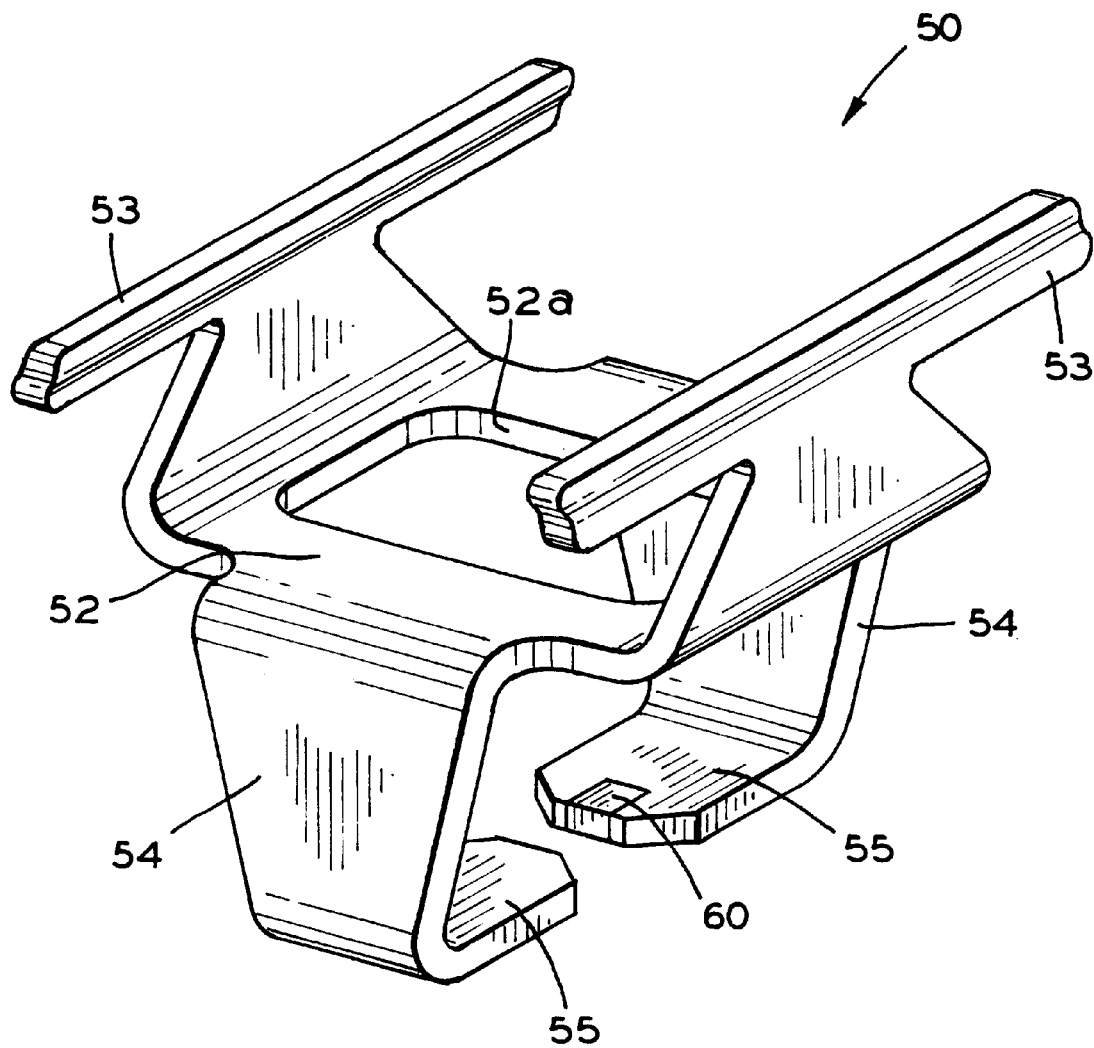
FIG. 3 is an enlarged perspective view of the interlock bracket illustrated in FIGS. 1 and 2.

The structure of the interlock bracket 50 is illustrated in detail in FIG. 3. As shown therein, the interlock bracket 50 includes a body 52 having an opening 52a formed therethrough. The lower end 16 of the shift lever 14 extends through the opening 52a of the interlock bracket 50 and, thus, the opening 41 formed through the mounting plate 40. A pair of generally T-shaped arms 53 extend upwardly from the body 52 and are adapted to engage the mounting plate 40 to support the interlock bracket 50 on the mounting plate 40 for selective lateral sliding movement, as described above. A pair of generally L-shaped arms 54 extending downwardly from the body 52, terminating in respective inwardly extending tabs 55.

In a manner that is well known in the art, the shift lever 14 can be moved by an operator of the vehicle to initially select, then subsequently shift one of the shift rails 28, 29, and 30 to provide a desired speed reduction gear ratio between the input shaft and the output shaft of the transmission 10. To accomplish this, the shift lever 14 is initially pivoted in the selecting direction indicated by the arrow 26 in FIG. 2 to select either the first shift rail 28 (by positioning the lower end 16 of the shift lever 14 in the notch formed in the connector bar 28c), the second shift rail 29 (by positioning the lower end 16 of the shift lever 14 in the notch formed in the second shift rail 29), or the third shift rail 30 (by positioning the lower end 16 of the shift lever 14 in the notch formed in the connector bar 30c). Such pivoting movement of the shift lever 14 causes lateral sliding movement of the interlock bracket 50, as indicated by the phantom lines in FIG. 2. When the lower end 16 of the shift lever 14 is positioned in the notch of any one of the shift rails (such as shown at 29 in FIG. 2), one or both of the lower arms 54 of the interlock bracket 50 will be positioned in the notches of the other two of the side rails (such as shown at 28 and 30 in FIG. 2) to prevent them from being moved axially out of their central neutral positions. The structure of the transmission 10 thus far described is conventional in the art.

Referring to FIGS. 2 and 3, it can be seen that a target 60 is mounted on or otherwise secured to the inner end of one of the lower arms 54 of the interlock bracket 50. The target 60 may be embodied as any structure that is capable of being sensed when positioned adjacent to a sensor. For example, the target 60 may be embodied as a permanent magnet that generates a magnetic field that is capable of being sensed when positioned adjacent to a magnetic field sensor. Although the target 60 is shown as being secured to the inner end of one of the lower arms 54, it will be appreciated that the target 60 may be mounted at any desired location on the interlock bracket 50. The purpose of the target 60 will be explained further below.

Figure 4:
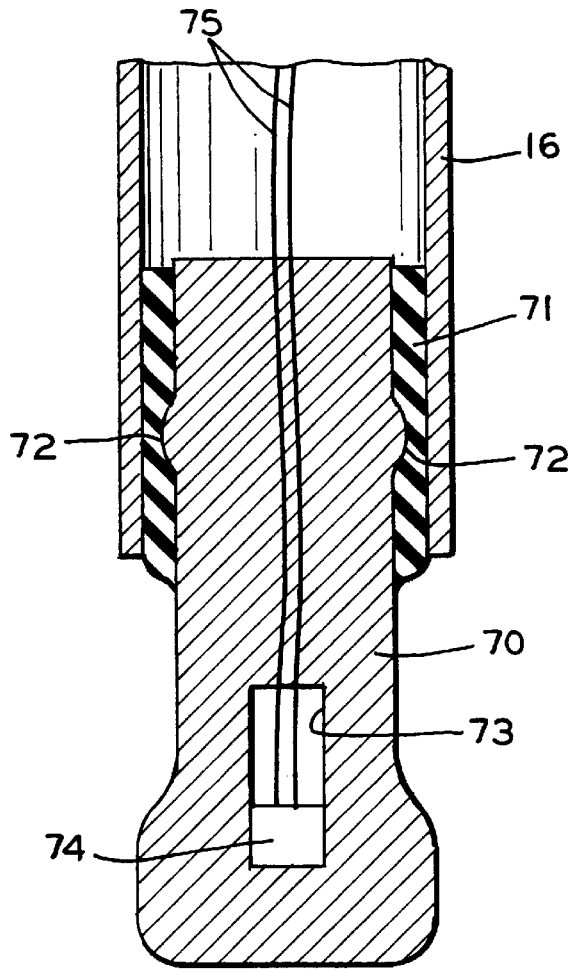
FIG. 4 is an enlarged sectional elevational view of the lower end of the shift lever illustrated in FIGS. 1 and 2.

Referring now to FIG. 4, the lower end 16 of the shift lever 14 is illustrated in detail. As shown therein, the lower end 16 of the shift lever 14 is formed having a hollow interior. A tang 70 is provided having an upper end that extends within the hollow interior of the lower end 16 of the shift lever 14. In the illustrated embodiment, the upper end of the tang 70 is slightly smaller than the hollow interior of the lower end 16 of the shift lever 14. A layer of a vibration dampening material 71 extends between the upper end of the tang 70 and the hollow interior of the lower end 16 of the shift lever 14 to retain the tang 70 therein. The vibration dampening material 71 is preferably an elastomeric material that reduces the magnitude of the vibrations that can be transmitted from the transmission 10 through the tang 70 (by virtue of its contact with the shift rails 28, 29, and 30) through the shift lever 14 to the driver of the vehicle. The tang 70 may, if desired, have one or more bulged portions 72 formed thereon that function as positive stops when a force is applied to the tang 70 by the shift lever 14 when the shift lever 14 is moved. The bulged portions 72 may improve the subjective "feel" of the axial shifting movement of the shift lever 14, while minimizing the engagement of the tang 70 with the lower end 16 of the shift lever 14 to reduce transmission of vibrations. For example, the clearance between the tang 70 and the interior of the lower end 16 of the shift lever may range from about one-sixteenth of an inch to about one-eighth of an inch, except at the bulged portions 72 where the clearance may range from about ten-thousandths of an inch to about twenty thousandths of an inch. Alternatively, the tang may be directly connected to or formed integrally with the lower end 16 of the shift lever 14, and a conventional vibration dampening structure may be provided in the upper end 15 of the shift lever 14.

A recess 73 is formed in the tang 70 at a location that is adjacent to the target 60 provided on the interlock bracket 50 when the shift lever and tower assembly 11 is assembled. A sensor 74 is disposed within the recess 73, and one or more electrical conductors 75 extend upwardly from the sensor 74 through the interior of the shift lever 14. As discussed above, the sensor 74 is responsive to the presence of the target 60 adjacent thereto for generating an electrical signal, the purpose of which will be explained below.

Thus, as best shown in FIG. 2, the target 60 is disposed adjacent to the sensor 74 whenever the lower end 16 of the shift lever 14 is located in the central neutral position. When this occurs, the sensor 74 generates an electrical signal on the electrical conductors 75. When the lower end 16 of the shift lever 14 is shifted axially forwardly or rearwardly to move the selected one of the shift rails 28, 29, or 30 into a gear engaging position, the lower end 16 of the shift lever 14 (carrying the sensor 74) is moved axially relative to the interlock bracket 50 (carrying the target 60). Thus, whenever the lower end 16 of the shift lever 14 is located outside of the central neutral position, the target 60 is not disposed adjacent to the sensor 74. Accordingly, the sensor 74 does not generate the electrical signal on the electrical conductors 75.

Figure 5:
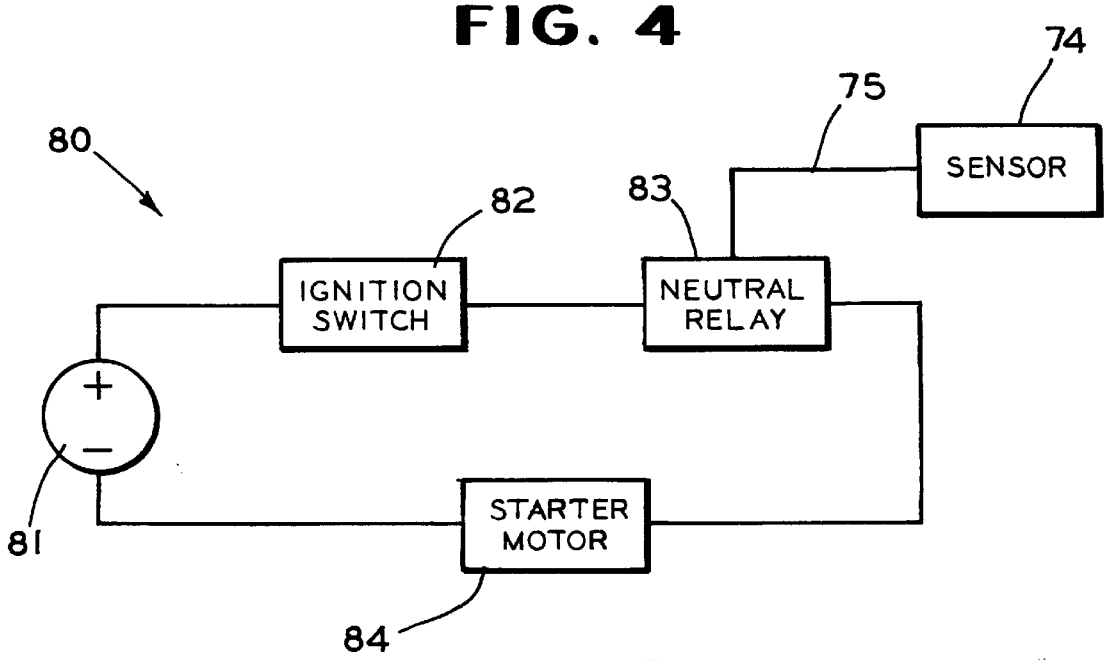
FIG. 5 is a block diagram of a starter circuit for a vehicle that is adapted for use with the combined neutral sensing and shift lever interlock assembly of this invention.

FIG. 5 is a block diagram that illustrates a starter circuit, indicated generally at 80, for a vehicle that is adapted for use with the combined neutral sensing and shift lever interlock assembly of this invention. The starter circuit 80 includes a battery 81 or other source of electrical energy that is connected in series circuit with a manually operable ignition switch 82, a neutral relay 83, and a starter motor 84. The sensor 74 is connected by the electrical conductors 75 (either directly or through a non-illustrated intermediate control circuit) to operate the neutral relay 83. When the lower end 16 of the shift lever 14 is positioned in the central neutral position, all of the shift rails 28, 29, and 30 must also be positioned in their central neutral positions. As a result, the sensor 74 causes the neutral relay 83 (or other switching mechanism) to be closed, thereby enabling the starter circuit 80 of the vehicle to start the vehicle engine in a conventional manner. When the lower end 16 of the shift lever 14 is positioned out of the central neutral position, one of the shift rails 28, 29, and 30 is not positioned in its central neutral position. Consequently, the sensor 74 causes the neutral relay 83 to be opened, thereby disabling the starter circuit 80 of the vehicle and preventing the engine from being started. Thus, the engine of the vehicle cannot be started unless all of the shift rails 28, 29, and 30 of the transmission 10 are positioned in the central neutral position. As a result, the vehicle is prevented from experiencing sudden and unintentional movement when the vehicle engine is attempted to be started while one of the shift rails 28, 29, and 30 is in a gear engaging position.

The combined neutral sensing and shift lever interlock assembly of this invention may be used in conjunction with any transmission structure. To accomplish this, the shift lever 14 and the interlock bracket 50 may be formed having any desired is shape or structure. Also, it will be appreciated that the sensor 74 may be provided on the interlock bracket 50, while the target 60 may be provided on the shift lever 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A neutral start switch mechanism for a vehicle transmission comprising:

a shift lever with an upper end and a lower end, said lower end in operational contact with a plurality of shift rails so that movement of said upper end results in movement of said lower end and selection and shifting of one of said shift rails from a neutral position to select a desired gear ratio;

an interlock plate configured so selection of one of said shift rails locks all other shift rails in a neutral position;

a sensor mounted on a first one of said lower end of said shift lever and said interlock plate; and a target mounted on a second one of said lower end of said shift lever and said interlock plate such that said sensor and said target are in alignment and a neutral signal generated when one of said plurality of shift rails is in a neutral position and all other shift rails are locked in a neutral position by said interlock plate.

2. The neutral start switch mechanism of claim 1, where said neutral signal closes an electrical circuit in the vehicle starter circuit to permit starting the vehicle.

3. The neutral start switch mechanism of claim 1, where said neutral signal opens an electrical circuit in the vehicle starter circuit to permit starting the vehicle.

4. The neutral start switch mechanism of claim 1, where said shift lever has an end defining a hollow interior, and further including a tang extending within said hollow interior of said end and a layer of a vibration dampening material extending between said tang and said hollow interior of said shift lever to retain said tang therein.

5. The neutral start switch mechanism of claim 4, where said tang has a bulged portion provided thereon that is disposed within said hollow interior of said end of said shift lever.

6. The neutral start switch mechanism of claim 5 where a clearance of from about 1/16" to 1/8" is provided between said tang and said hollow interior of said shift lever, and where a clearance of from about 0.01" to 0.02" is provided between said bulged portion of said tang and said hollow interior of said shift lever.

7. The neutral start switch mechanism of claim 4, where said vibration dampening material is rubber or plastic.

8. A transmission comprising:

a case containing an input shaft, an output shaft, a plurality of meshing gears, and a plurality of shift rails, each of said shift rails being supported for movement between a neutral position, wherein said output shaft is not connected to said input shaft, and a gear engaging position, wherein said output shaft is connected through at least some of said meshing gears to said input shaft;

a shift lever including a first end and a second end, said second end cooperating with said plurality of shift rails such that movement of said first end of said shift lever causes said second end of said shift lever to move a selected one of said shift rails to a gear engaging position;

an interlock cooperating with said shift lever and with said plurality of shift rails to prevent more than one of said shift rails from being moved to a gear engaging position at a time;

a target provided on a first one of said shift lever and said interlock; and a sensor provided on a second one of said shift lever and said interlock, said sensor being aligned with said target when all of said plurality of shift rails are in said neutral positions so as to generate a neutral signal.

9. The transmission defined in claim 8 further including an electrical circuit that is responsive to the generation of said neutral signal for enabling the operation thereof.

10. The transmission defined in claim 9 wherein said electrical circuit is a starter circuit for a vehicle.

11. The transmission defined in claim 8 wherein said shift lever has a recess formed therein, and wherein said sensor is disposed within said recess.

12. The transmission defined in claim 8 wherein said shift lever has a hollow end, and wherein a tang is supported within said hollow end of said shift lever.

13. The transmission defined in claim 12 wherein said tang has a recess formed therein, and wherein said sensor is disposed within said recess.

14. The transmission defined in claim 12 further including vibration dampening material extending between said tang and said hollow end of said shift lever.

15. The transmission defined in claim 12 wherein said tang has a bulged portion provided thereon that is disposed within said hollow end of said shift lever.

16. The transmission defined in claim 15 further including vibration dampening material extending between said tang and said hollow end of said shift lever.

17. The transmission defined in claim 15 wherein a clearance of from about 1/16" to 1/8" is provided between said tang and said hollow interior of said shift lever, and where a clearance of from about 0.01" to 0.02" is provided between said bulged portion of said tang and said hollow interior of said shift lever.

18. The transmission defined in claim 8 wherein said the interlock includes a body having an opening through which said shift lever extends, a first pair of arms extending from said body and engaging a portion of said case for sliding movement relative thereto, and a second pair of arms extending from said body and cooperating with said plurality of shift rails.

19. The transmission defined in claim 16 wherein said target is provided on one of said second pair of arms.

20. The transmission defined in claim 8 wherein said sensor is a magnetic field sensor and wherein said target is a permanent magnet.

* * * * *